Feb. 12, 1924.                                                1,483,441
                    L. J. HIBBARD
                  MOTOR CONTROL SYSTEM
                  Filed Nov. 12, 1920
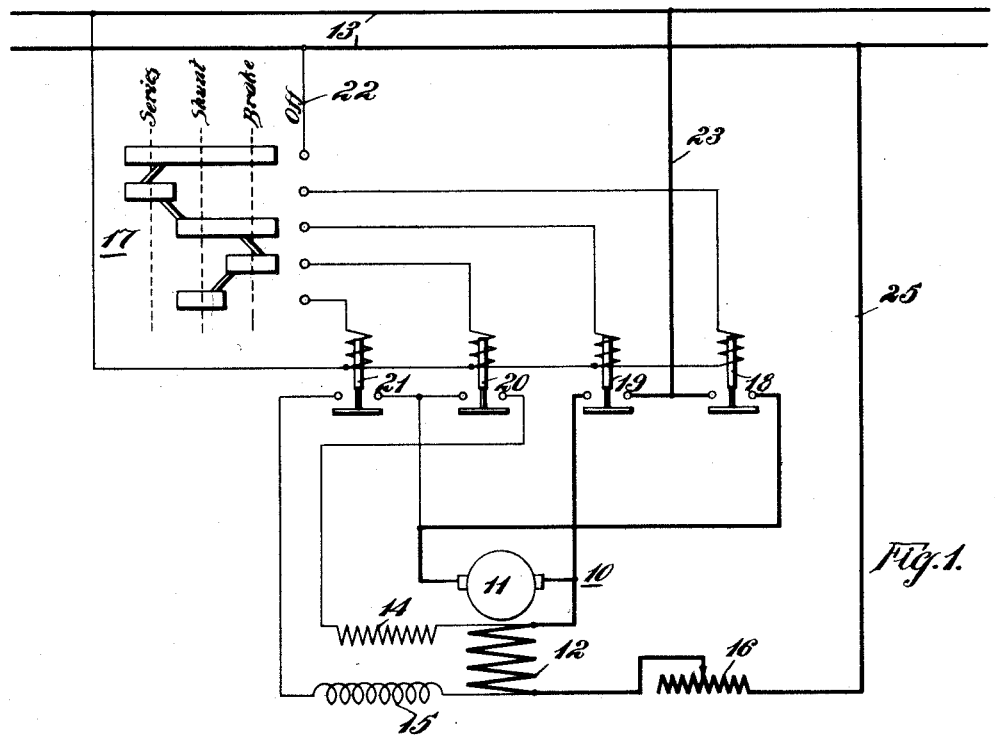
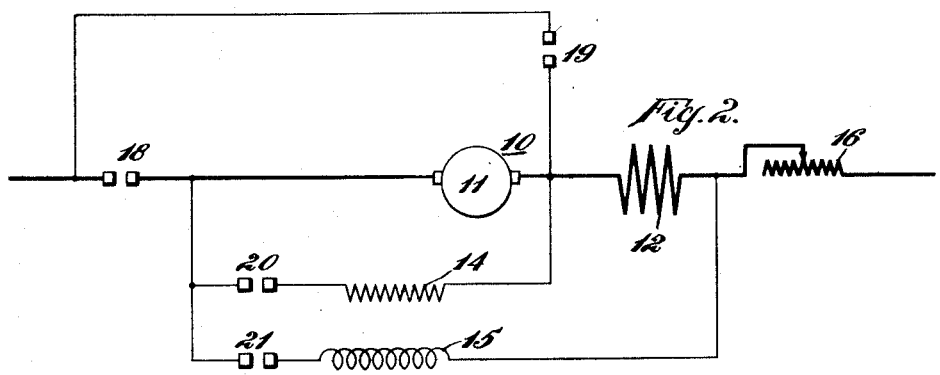
WITNESSES:                                    INVENTOR
                                              Lloyd J. Hibbard
                                              BY
                                              Wesley G. Carr
                                              ATTORNEY Patented Feb. 12, 1924.

1,483,441

UNITED STATES PATENT OFFICE.

LLOYD J. HIBBARD, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 12, 1920. Serial No. 423,549.

*To all whom it may concern:*

Be it known that I, LLOYD J. HIBBARD, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has special relation to systems for operating cranes, hoists and similar machines.

One object of my invention is to provide a system of the above-indicated character which shall be simple and inexpensive in construction and efficient and reliable in operation, and which, moreover, shall obviate certain difficulties which have heretofore been experienced in such systems.

A further object of my invention is to provide a system whereby an alternating-current motor may be operated either as a series-wound motor or as a shunt-wound motor and to effect dynamic braking after either operation, irrespective of the direction of rotation of the motor armature.

In the prior art, various systems have been proposed for electrically braking alternating-current motors by arranging circuits to adapt the motors to return alternating current to the supply circuit or by exciting the motors from the supply circuit and connecting the armatures through suitable translating devices. However, many operating difficulties and undesirable conditions have arisen, partially by reason of the heavy wattless current and relatively low power factors that obtain. Moreover, in many cases, no means for electrically braking the motor has been available, with the result that mechanical brakes have been employed to meet certain conditions, such as safely lowering a heavy load.

More specifically stated, my invention involves the employment of a motor having an armature and a field-magnet winding, said winding being adapted to be shunted across the line for shunt motoring, to be connected in series with the armature for series motoring and to be separately excited, while the armature and a resistor are included in a separate closed circuit, to electrically brake said motor, together with control means for regulating these respective operations by controlling the circuits to certain electromagnetic switches.

My invention may be best understood from the accompanying drawings, wherein—

Figure 1 is a diagrammatic view of circuits and apparatus embodying my invention;

Fig. 2 is a schematic view of the main circuits; and

Fig. 3 is a sequence chart, of well-known form, for indicating the preferred order of closure of the respective switches.

Referring to Fig. 1, an alternating-current motor 10, having an armature 11 and a field-magnet winding 12, is shown as receiving current from a plurality of suitable supply-circuit conductors 13.

A resistance element 14, adapted to be connected in circuit with the armature of the motor, and a reactance element 15, also adapted to be connected in series relation with the armature 11, are also shown. In circuit with the field-magnet winding 12 is a field rheostat 16, which may be used when the motor is operating as a shunt motor, in the customary manner.

A controller 17, having three positions, appropriately designated by the legends "Series," "Shunt," and "Brake," is adapted to control the circuits leading to the actuating coils of a plurality of electromagnetic switches 18, 19, 20 and 21.

Referring to the operation of my invention, when it is desired to lower a load the controller 17 may be moved to the position designated by the legend "Shunt," wherein the controller is energized from supply conductor 22. This action, in turn, energizes the coils of the electromagnetic switches 19 and 21, thereby closing these switches, as indicated in the corresponding line of the sequence chart, Fig. 3. The circuit for the armature 11, then includes supply conductor 23, the bridged fingers of switch 19, armature 11, the bridged fingers of switch 21 and reactor 15. The separate line circuit for the field-magnet winding 12 will include supply conductor 23, the bridged fingers of switch 19, winding 12, field rheostat 16 and supply conductor 25. The motor will then operate as a shunt-wound motor, in a well-known manner, as will be clear from an inspection of the simplified diagram of Fig. 2.

To accelerate the speed of the motor, or to hoist a load, the controller is advanced to the "Series" position, wherein the circuits to the coils of the switches 19 and 21 are broken, thereby opening these switches, and the circuit to the coil of switch 18 is completed, thus energizing that coil and closing its switch, as indicated in the corresponding line of the sequence chart, Fig. 3. The circuit for the motor will then include supply conductor 23, the bridged fingers of switch 18, armature 11, field-magnet winding 12 and supply conductor 25. The motor will then operate as the well-known alternating-current series commutator motor, as will be evident from an examination of Fig. 2.

Assume that the motor is running under either of the above conditions and that it is desired to bring the motor to rest quickly. A dynamic-braking circuit may then be completed by returning the controller 17 to the "Brake" position, wherein the coil of the switch 18 will be deenergized, thereby opening this switch, and the coils of switches 19 and 20 will be energized, thereby closing these switches, as indicated in the corresponding line of the sequence chart, Fig. 3. A circuit for the field-magnet winding will then be completed from supply conductor 23 across the bridged fingers of switch 19 to winding 12, thereby separately exciting the field winding. This operation of the controller will also complete a separate closed circuit for the momentum-rotated armature which will include the bridged fingers of switch 20 and the resistor 14. This connection of the armature and field-magnet winding will effect a reversal of their relations so that the armature 11 will now rotate in the flux produced by the energized field-magnet winding 12 to set up an alternating-current braking circuit for the armature. The new connections just outlined will be evident from an inspection of Fig. 2.

It will be noted that the controller 17 has been simplified and conveniently arranged by having the "Brake" position next to the "Off" position, so that, when it is desired to make the brake connections, the movement of the controller is in the natural direction for de-energizing the motor; and it is but a single step from the "Brake" position to the "Off" position. Also, these braking connections may be immediately formed after operation from either the "Shunt" position of the controller or from the "Series" position.

The above description has been made on the assumption that the motor is arranged for shunt connection when starting, with series acceleration, but it will be understood that these conditions may be reversed. Furthermore, the motor connections may be so made that the motor will operate in one direction with the windings in series relation and, after being brought to rest, in the opposite direction with the windings in shunt relation. With a controller similar to the one herein illustrated, the desired dynamic braking may be obtained from either position, irrespective of what the motor connections may be.

It is believed that detailed reference need not be made to the schematic diagram in Fig. 2, as this figure, considered in conjunction with the previous description and with the sequence chart of Fig. 3, will be readily understood.

The advantages of dynamically braking a motor in securing a reduction of brake-shoe wear, increase of safety in the operation of a hoist, etc., are well known and need not be here detailed at length. It should be noted that the present invention accomplishes the desired results in a novel, simplified manner and provides efficient and reliable operation.

While this invention has been described with particular reference to hoists, it will be understood that it has numerous other uses.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:—

1. In a system of control for a dynamo-electric machine having an armature and a main field-magnet winding, the combination with a resistor and a reactor adapted to be alternately connected in series relation with said armature, of means for reversing the relation of said armature and said main field winding to produce a dynamic-braking current for said machine without changing the connection of said main field winding to said armature.

2. In a system of control for an alternating-current motor having an armature and a field-magnet winding, the combination with a reactor and a resistor, of means for effecting a series connection of said reactor and said armature during the shunt operation only of said motor, for including said resistor in a closed circuit with said armature when it is desired to electrically brake said motor, and for also separately exciting said field-magnet winding.

3. A system of control for an alternating-current motor having an armature and a field-magnet winding adapted to be operated in series relation, comprising a reactance element adapted to be connected in series relation with said armature during shunt operation only of said motor and a resistance element adapted to be connected in a closed circuit with said armature under certain other conditions.

4. In a system of control for an alternating-current motor having an armature winding, a field-magnet winding, and means for separately exciting said field-magnet winding, the combination with a resistor adapted to be connected in series relation with said armature under predetermined operating conditions, of control means for effecting series and shunt relations of said windings and for also connecting said armature in a closed circuit with said resistor at a time when the field-magnet winding is separately excited.

5. In a system of control, the combination with a supply circuit and an alternating-current motor of the commutator type having an armature and a field winding, of a resistor and a reactor, means for connecting said reactor in series relation with said armature during shunt operation of the motor, and means for connecting said resistor in a closed circuit with said armature to produce a braking current.

6. In a system of control, the combination with a supply circuit and an alternating-current motor of the commutator type having an armature and a field winding, of a resistor and a reactor, a switch for connecting said armature and field winding in series relation across said supply circuit, a second switch connected between one side of the supply circuit and a point intermediate the armature and the field winding, a third switch for connecting said reactor to the outer terminals of the motor, whereby, upon the concurrent closure of said second and said third switches, the motor operates as a shunt motor, and a fourth switch for connecting said resistor across the armature, whereby, upon the closure of said second and said fourth switches, the armature produces a braking current and the field winding is energized directly from the supply circuit.

In testimony whereof, I have hereunto subscribed my name this first day of November, 1920.

LLOYD J. HIBBARD.